United States Patent
Ivanov et al.

(10) Patent No.: US 8,737,209 B2
(45) Date of Patent: *May 27, 2014

(54) SYSTEM AND METHOD FOR DETERMINING EFFECTS OF NON-NETWORK ELEMENTS ON THE SUBSCRIBER EXPERIENCE IN A MOBILE NETWORK

(75) Inventors: Angel Zlatkov Ivanov, Ashburn, VA (US); Neil Stobie, Reston, VA (US); Prathima Simha, Great Falls, VA (US)

(73) Assignee: Ascom Network Testing Inc., Reston, VA (US)

( * ) Notice: Subject to any disclaimer, the term of this patent is extended or adjusted under 35 U.S.C. 154(b) by 545 days.

This patent is subject to a terminal disclaimer.

(21) Appl. No.: 13/026,269

(22) Filed: Feb. 13, 2011

(65) Prior Publication Data

US 2012/0207034 A1 Aug. 16, 2012

(51) Int. Cl.
*H04L 12/26* (2006.01)
*H04J 1/16* (2006.01)
*H04L 12/66* (2006.01)

(52) U.S. Cl.
USPC ............ 370/230; 370/252; 370/254; 370/401

(58) Field of Classification Search
USPC ................. 370/229–240, 310–350, 241–252, 370/254–255, 400–401; 709/223–226, 229, 709/230–244
See application file for complete search history.

(56) References Cited

U.S. PATENT DOCUMENTS

| | | | |
|---|---|---|---|
| 6,901,440 B1* | 5/2005 | Bimm et al. | 709/223 |
| 2006/0015814 A1* | 1/2006 | Rappaport et al. | 715/733 |
| 2008/0089347 A1 | 4/2008 | Phillipi et al. | |
| 2008/0288634 A1* | 11/2008 | Onacko et al. | 709/224 |
| 2009/0075648 A1* | 3/2009 | Reed et al. | 455/424 |
| 2009/0161530 A1* | 6/2009 | Yang et al. | 370/216 |
| 2012/0207035 A1* | 8/2012 | Simha et al. | 370/252 |
| 2013/0051280 A1* | 2/2013 | Zhang et al. | 370/259 |

OTHER PUBLICATIONS

International Search Report dated Apr. 13, 2012 issued in PCT counterpart apllication (PCT/US2012/024714).
Written Opinion dated Apr. 13, 2012 issued in PCT counterpart application (PCT/US2012/024714).
International Search Report dated Apr. 13, 2012 issued in related PCT application (PCT/US2012/024719).
Written Opinion dated Apr. 13, 2012 issued in related PCT application (PCT/US2012/024719).

* cited by examiner

*Primary Examiner* — Tri H Phan
(74) *Attorney, Agent, or Firm* — Womble Carlyle Sandridge & Rice, LLP

(57) ABSTRACT

Various methods, systems, and computer program products are disclosed for determining effects of non-network elements on a subscriber experience. For example, a method may include receiving traffic data. In some implementations of the invention, the method may include associating the traffic data with one or more non-network elements, which may operate on the mobile network but are not part of an infrastructure of the mobile network. The method may include determining a subscriber experience for the one or more non-network elements based on the traffic data that is associated with the one or more non-network elements.

30 Claims, 4 Drawing Sheets

SYSTEM AND METHOD FOR DETERMINING EFFECTS OF NON-NETWORK ELEMENTS ON THE SUBSCRIBER EXPERIENCE IN A MOBILE NETWORK

CROSS-REFERENCE TO RELATED APPLICATIONS

This application is related to co-pending U.S. patent application Ser. No. 13/026,270, now U.S. Pat. No. 8,619,610, which is concurrently filed herewith, entitled "System and Method For Determining Effects Of Non-Network Elements On Network Resource Utilization in a Mobile Network."

FIELD OF THE INVENTION

The disclosure relates to analyzing a mobile network and in particular to determining effects of non-network elements on the subscriber experience in mobile networks.

BACKGROUND OF THE INVENTION

Conventional mobile network analysis systems typically assess network elements when troubleshooting a mobile network. Such conventional systems typically analyze the infrastructure of the mobile network but ignore non-network elements that are not part of the infrastructure. For example, conventional systems typically analyze base stations, radio network controllers, distribution systems, and other infrastructure components of the mobile network. However, oftentimes sources of subscriber experience and/or resource utilization problems include non-network elements such as makes (i.e., vendors) or models of mobile devices, operating systems of mobile devices, mobile applications operating via the mobile network on the mobile devices, and other non-network elements that are not part of the mobile network infrastructure. Thus, conventional systems fail to determine the effect of non-network elements on the subscriber experience and/or resource utilization.

Conventional systems also fail to determine whether different communication procedures such as messages that cause a mobile device to operate in various communication states will result in improved subscriber experiences and/or utilization of network resources. For example, using conventional systems, it is difficult to determine whether one communication procedure will lead to improved utilization of subscriber experiences and/or network resources than another communication procedure. Oftentimes operators of mobile networks and other entities do not appreciate that changing from one communication procedure to another communication procedure will result in improved subscriber experiences and/or utilization of network resources.

Furthermore, conventional systems fail to leverage or do not have access to particular forms of traffic data that can indicate subscriber experience and/or utilization of the mobile network resources associated with non-network elements.

Thus, what is needed is a network analysis system that can determine effects of non-network elements on subscriber experiences and/or resource utilization. What is further needed is to leverage particular traffic data in order to assess the mobile network in the context of non-network elements. These and other drawbacks exist.

SUMMARY OF THE INVENTION

Various methods, systems, and computer program products are disclosed for determining effects of non-network elements on a subscriber experience. According to various implementations of the invention, a method may include receiving traffic data. The traffic data may be generated by non-network elements such as mobile devices operating on the mobile network. The method may include associating the traffic data with one or more non-network elements, which operate on the mobile network but are not part of an infrastructure of the mobile network. The non-network elements may include, for example, a make (i.e., vendor) of a mobile device, a model of a mobile device, an operating system of a mobile device, a mobile application operating via the mobile network, or a version of a mobile application. The method may include determining a subscriber experience for the one or more non-network elements based on the traffic data that is associated with the one or more non-network elements. The subscriber experience may be indicated by one or more of a number of dropped calls, an accessibility, a retainability, a mobility, a voice quality, a data integrity, or a data transfer rate.

Various implementations of the invention allow identifying and addressing factors that influence the subscriber experience. As such, various implementations of the invention may be used to help operators, service providers, infrastructure vendors, device manufacturers, mobile application developers, and others understand the impact that non-network elements have on the subscriber experience. Furthermore, various implementations of the invention facilitate evaluation of subscriber devices, subscriber device vendors, subscriber device operating systems and mobile applications by determining their effects on the subscriber experience.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

DETAILED DESCRIPTION OF THE INVENTION

Figure 1:
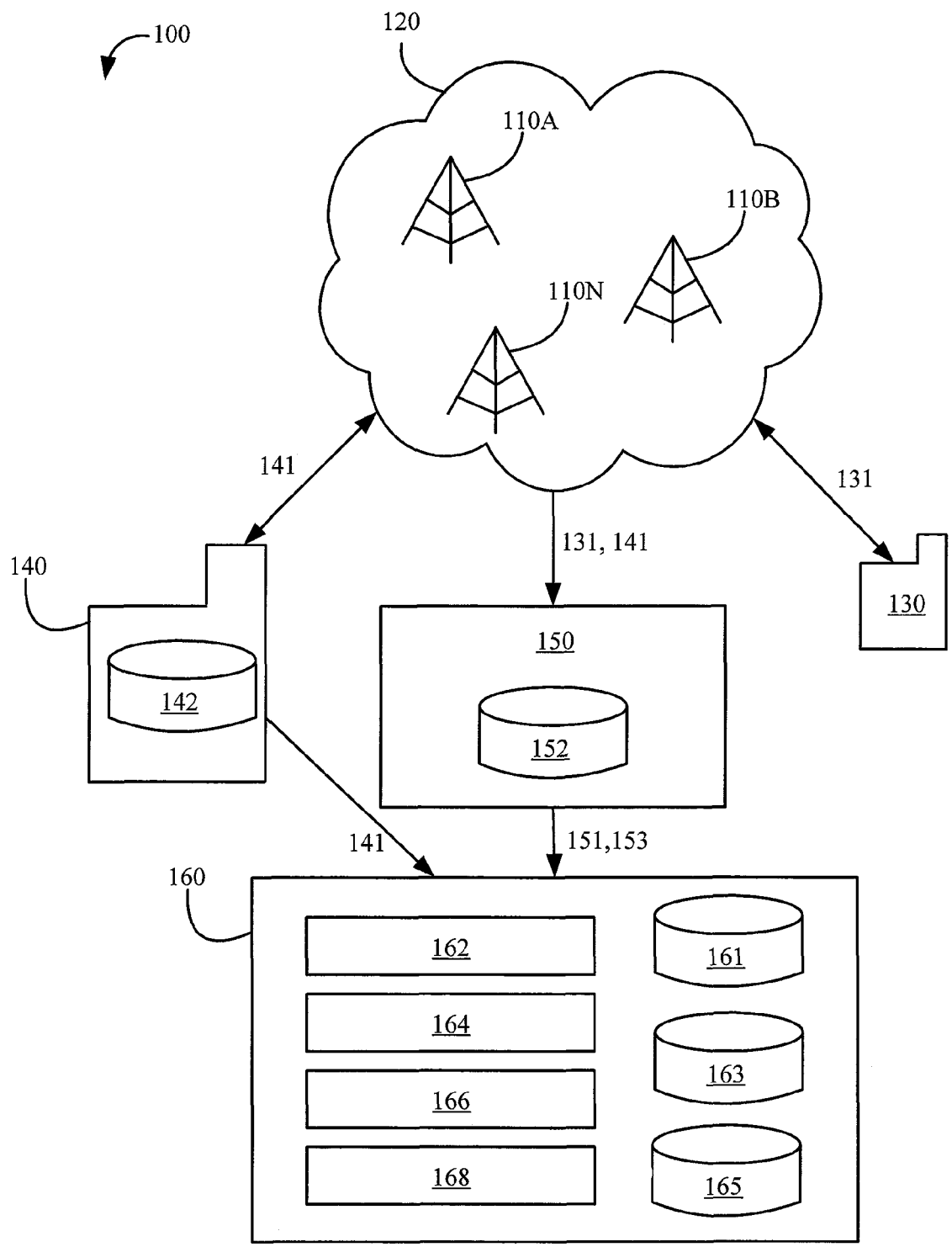
FIG. 1 is a block diagram illustrating a system of determining effects of non-network elements in mobile networks, according to various implementations of the invention.

FIG. 1 is a block diagram illustrating a system 100 of determining effects of non-network elements in mobile networks, according to various implementations of the invention. Non-network elements operate on but are not part of an infrastructure of a mobile network. In other words, unlike network elements such as, for example, base stations, radio network controllers (RNCs), and Evolved Node Bs (eNBs), non-network elements are not necessary to operate the mobile network. For example, while network elements offer mobile services, subscribers use non-network elements to use the services provided by the network elements. In some implementations, non-network elements may include, for example, a vendor (manufacturer) of a mobile device, a model of a mobile device, an operating system of a mobile device, a version of an operating system of a mobile device, a mobile application, a version of a mobile application, and/or other elements that operate on but are not part of the mobile network.

In some implementations of the invention, system 100 analyzes traffic data from various sources or combination of sources in order to determine the effects of non-network elements. In some implementations, traffic data may include, among other things, measurements of the mobile network, measurements of devices communicating over the mobile network, identification of non-network elements operating on the mobile network, and/or other information that may be determined from communications over the mobile network.

In some implementations of the invention, system 100 may use particular traffic data in a manner that enables detailed analysis that conventional network analyzers fail to use. For example, system 100 may use subscriber traffic data from an Operational Support System (OSS), test traffic data from the OSS, test traffic data from testing equipment, and/or various combinations of the foregoing as described herein.

In some implementations of the invention, system 100 may be used to determine the effect of non-network elements on subscriber experience. In other words, system 100 may be used to correlate subscriber experience with different non-network elements. The subscriber experience may be determined using metrics that indicate an end user or subscriber experience such as, among others, dropped calls.

For example, system 100 may be used to determine subscriber experience for particular mobile devices, operating systems of mobile devices, operation system versions, mobile applications, and/or other non-network elements. In this manner, a network operator or other entity may determine which non-network elements perform better than others and/or provide insight how the subscriber experience may be improved for certain non-network elements.

In some implementations of the invention, system 100 may be used to determine the effect of non-network elements on utilization of network resources. In other words, system 100 may be used to correlate resource utilization in a network with different non-network elements. Utilization of network resources may be indicated by, for example, a number of connection requests from a mobile device, a number of channel switching per mobile device make/model, a time spent in different states (such as a DCH state, a FACH state, a PCH state or other state as would be appreciated), a type of traffic, and/or other metrics. In this manner, a network operator or other entity may determine which non-network elements use more network resources than others and/or provide insight how the resource utilization may be reduced.

In some implementations of the invention, system 100 may determine network resource utilization based on a first communication procedure and may predict a change in the network resource utilization and/or subscriber experience if a second communication procedure was used. In some implementations, this may be accomplished by simulating the behavior of one or more non-network elements when using the second communication procedure. In this manner, the beneficial (or harmful) effects of using one communication procedure over another communication procedure may be determined. For example, the second communication procedure may change the incidence of dropped calls and/or number of connection request messages relative to the first communication procedure.

In some implementations of the invention, system 100 may include, among other things, one or more base stations 110 (illustrated in FIG. 1 as base stations 110A, 110B, ..., 110N), a mobile network 120, one or more subscriber units 130 (hereinafter "subscriber unit 130" for convenience, one or more test mobile 140 (hereinafter "test mobile 140"), an Operational Support System (OSS) server 150, and a computing device 160. In some implementations of the invention, mobile network 120 may include one or more cells from at least a portion of base stations 110. In some implementations, mobile network 120 may be coupled to other communication networks (not illustrated in FIG. 1) such as a Local Area Network, a Wide Area Network, a Public Switched Telephone Network, and/or other network or combination of networks. In some implementations, subscriber unit 130, test mobile 140, OSS server 150, and computing device 160 may be coupled to one another via mobile network 120 and/or other network.

In some implementations of the invention, subscriber units 130 may include mobile devices, such as cellular phones, tablet devices, laptop computers, and/or other devices that communicate via mobile network 120, that are used by subscribers. In some implementations, non-network elements may include a vendor of subscriber unit 130, a particular model of subscriber unit 130, an operating system of subscriber unit 130, a mobile application executing on subscriber unit 130 and/or other non-network element associated with subscriber unit 130. In some implementations, traffic data (illustrated in FIG. 1 as "subscriber traffic data 131") may be generated based on communications to and/or from subscriber unit 130.

In some implementations of the invention, test mobile 140 may include various testing devices that simulate communication on mobile network 120 and collect traffic data (illustrated in FIG. 1 as "test traffic data 141") based on the simulated communication. In some implementations, test mobile 140 may include a test database 142 that stores test traffic data 141. In some implementations, test traffic data 141 includes substantially similar information as subscriber traffic data 131. In some implementations, test traffic data 141 may include additional or different information than subscriber traffic data 131.

In some implementations of the invention, OSS server 150 receives subscriber traffic data 131 and/or test traffic data 141. In some implementations, OSS server 150 does not distinguish subscriber traffic data 131 and test traffic data 141 from one another at least in part because test traffic data 141 originates from simulated communications. In some implementations, OSS server 150 stores subscriber traffic data 131 and/or test traffic data 141 in OSS database 152.

In some implementations of the invention, computing device 160 may include, among other things, a subscriber experience module 162, a resource utilization module 164, a processor 166, and a memory 168. In some implementations, computing device 160 may include or otherwise access an OSS subscriber traffic database 161 that stores subscriber traffic data 151, an OSS test traffic database 163 that stores test traffic data 153, and a test traffic database 165 that stores test traffic data 141. Although illustrated as three separate databases, OSS subscriber traffic database 161, OSS test traffic database 163, and test traffic database 165 may be included in one or more databases as would be appreciated.

In some implementations of the invention, computing device 160 may receive traffic data. In some implementations of the invention, receives subscriber traffic data 151 from OSS server 150. Subscriber traffic data 151 includes the same data as subscriber traffic data 131 but is numbered differently in FIG. 1 for clarity to indicate the source of the data is OSS server 150 rather than subscriber unit 130.

In some implementations of the invention, computing device 160 receives test traffic data 153 from OSS server 150. Test traffic data 153 includes the same data as test traffic data 141 but is numbered differently in FIG. 1 for clarity to indicate the source of the data is OSS server 150 rather than test mobile 140.

In some implementations of the invention, computing device 160 receives test traffic data 141 from test mobile 140. For example, test mobile 140 may be configured to communicate with computing device 160 in order to provide test traffic data 141.

In some implementations of the invention, computing device 160 uses subscriber traffic data 151 to determine effects of non-network elements on subscriber experience and/or resource utilization. Subscriber traffic data 151 is derived from actual subscriber communications. Thus, in some implementations, using subscriber traffic data 151 facilitates analyzing actual subscriber behavior, giving an insight to the true experience the subscribers are experiencing. Discovering this and addressing poor experiences may reduce subscriber churn. In some implementations of the invention, computing device 160 uses test traffic data 153 to determine effects of non-network elements on subscriber experience and/or resource utilization. In some implementations, test traffic data 153 is simulated and based on one or more predefined criteria. One benefit of using test traffic data 153 is an ability to obtain data based on a controlled environment, although not necessarily describing actual subscriber patterns. In some implementations, the controlled environment facilitates hypothetical "what-if" scenarios and comparing results with existing non-network elements and their configuration. In some implementations, using test traffic data 153 facilitates operators or other entities to test mobile devices or other non-network elements based on subscriber experience in a real environment as opposed to merely testing it in the laboratory. Based on the tests, the operators may approve use of a mobile device or other non-network element on their network.

In some implementations of the invention, computing device 160 uses subscriber traffic data 151 and test traffic data 153 to determine effects of non-network elements on subscriber experience and/or resource utilization. One benefit of using both subscriber traffic data 151 and test traffic data 153 helps compare subscriber experience or resource utilization of a non-network element under consideration (i.e., being tested) with approved, established non-network elements. For example and not limitation, a newer revision of a non-network element may be compared with an older revision prior to placing the newer revision into production.

In some implementations of the invention, computing device 160 uses subscriber traffic data 151, test traffic data 153, and test traffic data 141 to determine effects of non-network elements on subscriber experience and/or resource utilization. In some implementations, the combination facilitates the OSS data to be paired with additional data (actual application behavior, OS of the device, resource usage on the device and so on).

In some implementations of the invention, computing device 160 uses test traffic data 153 and test traffic data 141 to determine effects of non-network elements on subscriber experience and/or resource utilization. In some implementations, information of certain non-network elements may not be available in the data collected at the OSS. For example, a subscriber using a mobile application may be detected as a subscriber using a data service, but an identification of the particular mobile application being used may be unavailable. In these implementations, such information may be captured at the test mobile and merged with its corresponding data from the OSS to be able to provide additional information for the subscriber experience and resource utilization. In some implementations, additional radio level measurements as seen by the mobile device can also be gathered to provide more information that can lead to identifying cause of poor subscriber experience.

In these and other implementations using both test traffic data 153 and test traffic data 141, computing device 160 may correlate information or records between test traffic data 153 and test traffic data 141 such as by identifying particular testing equipment that generated each record of test traffic data 153 and 141.

In some implementations of the invention, computing device 160 may associate the traffic data with one or more non-network elements. In other words, non-network elements that were part of communications that resulted in the traffic data may be determined. In this manner, traffic data may be analyzed in the context of the non-network elements. For example, traffic data from mobile devices using a particular operating system (i.e., a non-network element) may be analyzed based on an association between the traffic data and the particular operating system. Thus, traffic data of the particular operating system or other non-network element may be analyzed to determine its effect on subscriber experiences and/or resource utilization.

In some implementations of the invention, subscriber experience module 162 may determine effects of non-network elements on subscriber experience based on the association. In some implementations of the invention, resource utilization module 164 may determine effects of non-network elements on utilization of network resources based on the association.

In some implementations of the invention, subscriber experience module 162 may determine a subscriber experience for the one or more non-network elements that were associated with the traffic data. In some implementations, the subscriber experience may include one or more of: a number (or rate) of dropped calls, an accessibility, a retainability, a mobility, a voice quality, a data integrity, a data transfer rate, and/or other metric by which a subscriber experience of a call or data transfer can be measured. In some implementations, each type of subscriber experience may be determined by using one or more respective performance indicators. Such indicators are listed by example and not limitation in Table 1 below.

TABLE 1

| Subscriber experience performance indicators. | |
|---|---|
| Accessibility | Call Attempts |
| | Blocked Calls |
| | Blocked Call Rate (%) |
| | RRC Connection Blocks |
| | RRC Connection Block Rate (%) |
| | Initial RAB Establishments Attempts |
| | Initial RAB Establishment Blocks |
| | Initial RAB Establishment Blocks (%) |
| Retainability | Normal End Calls |
| | Dropped Calls |
| | Dropped Call Rate (%) |
| | Main Service Minutes |
| | Minutes per Drop |
| Mobility | SOHO Successes |
| | SOHO Failures |
| | SOHO Failure Rate (%) |
| | Missing Neighbor Events |
| | MN Dropped Call |

TABLE 1-continued

Subscriber experience performance indicators.

| | |
|---|---|
| | IFHO Attempts |
| | IFHO Successes |
| | IFHO Failures |
| | IFHO Failure Rate (%) |
| | IRAT HO Attempts |
| | IRAT HO Success |
| | IRAT HO Failures |
| | IRAT HO Failure Rate (%) |
| | IRAT CC Success |
| | IRAT CC Failures |
| | IRAT CC Failure Rate (%) |
| | HS Cell Change Success |
| | HS Cell Change Failures |
| | HS Cell Change Failure Rate (%) |
| | Compressed Mode Starts |
| Data Integrity | Avg HS Throughput (kbps) |
| | HS Throughput Samples |
| | Avg User HS Throughput (kbps) |
| | User HS Throughput Samples |
| | Avg HS Throughput Delta (kbps) |
| | HS Throughput Delta Samples |
| | Avg EUL Throughput (kbps) |
| | EUL Throughput Samples |
| | Avg User EUL Throughput (kbps) |
| | User EUL Throughput Samples |
| | Avg EUL Throughput Delta (kbps) |
| | Avg EUL Throughput Delta Samples |

In some implementations of the inventions, the subscriber experience may be negative or positive. In some implementations, for example, traffic data may be associated with a negative subscriber experience so that particular non-network elements that lead to poor subscriber experiences may be identified. In these implementations, various performance indicators or other metrics may be analyzed to determine a cause of the poor subscriber experience such as a high number of dropped calls. In some implementations, the two or more non-network elements that perform the worst (or best) with respect to poor subscriber experience. For example, the two or more particular phone models that had the highest (or lowest) number of dropped calls may be determined. In this manner, the worst (or best) performers may be identified. Such identifications may be used to troubleshoot the non-network elements, such as the phone models that led to the highest numbers of dropped calls, in order to improve their performance.

In some implementations, various filters may be applied to the traffic data so that only a subset is analyzed. For example, a configurable threshold may be defined so that only models of mobile devices having calls or data transfers exceeding the configurable threshold are analyzed. In this manner, computing device 160 may minimize fluctuations due to small sample sizes.

In some implementations of the invention, subscriber experience module 162 may determine the effect of one non-network element such as a mobile application on another non-network element such as a mobile device with respect to the subscriber experience. For example, subscriber experience module 162 may determine a subscriber experience associated with a performance of a mobile application on a mobile device based on the traffic data. In particular, based on traffic data associated with a particular mobile device such as subscriber unit 130, a performance of a mobile application installed or operating on the particular mobile device may be determined.

In some implementations of the invention, the effect of one type of non-network elements on another type of non-network elements may be predicted. In some implementations, the prediction may be based on a simulation of the behavior one non-network element and/or at least one other non-network element based on the traffic data. For example, the prediction may be based on a simulation of how a mobile application and/or mobile device will perform on mobile network 120 based on traffic data, which indicates prior performance of the mobile application and/or mobile device.

In some implementations of the invention, subscriber experience module 162 may predict a performance of a mobile application hypothetically operating on a mobile device such as subscriber unit 130 based on the traffic data. In other words, the prediction may be made by simulating operation of the mobile application on the mobile device based on traffic data. In some implementations, subscriber experience module 162 may determine the prediction by comparing various performance indicators and/or requirements associated with the mobile device with performance indicators and/or requirements associated with the mobile application to predict the subscriber experience with respect to the mobile application operating on the mobile device. In this manner, how a particular mobile application will perform on a particular mobile device may be predicted.

In some implementations, a subscriber experience with respect to the mobile application may be predicted. For example, determining the subscriber experience may include predicting dropped calls if the mobile application is in use, predicting performance of the mobile application if in use, and/or other subscriber experiences related to the mobile application.

In some implementations of the invention, subscriber experience module 162 may determine a subscriber experience associated with a performance of a particular mobile device on the mobile network based on the traffic data. In this manner, how a particular mobile device will perform on mobile network 120 may be predicted.

In some implementations of the invention, subscriber experience module 162 may determine a subscriber experience associated with a performance of a particular mobile application on the mobile network based on the traffic data. In this manner, how a particular mobile application will perform on mobile network 120 may be predicted.

In some implementations of the invention, resource utilization module 164 may determine a first communication procedure used by the one or more non-network elements based on the associated traffic data. For example, the traffic data may include an indication of a particular communication procedure that was used by the one or more non-network elements.

In some implementations of the invention, resource utilization module 164 may determine a utilization of network resources by the one or more non-network elements based on the first communication procedure. Different procedures may utilize resources differently. Thus, resource utilization module 164 may determine a particular utilization of network resources of the first communication procedure. Furthermore, in some implementations, different non-network network elements may implement the same communication procedure differently, thereby resulting in different resource utilizations across different non-network elements that use the same communication procedure but implement them differently. For example, different mobile devices may implement a particular communication procedure differently so that one mobile device model utilizes more resources when implementing the communication procedure differently than another mobile device model. In these implementations, resource utilization module 164 may identify these differences so that, for example, poorer performers may be corrected.

In some implementations of the invention, resource utilization module 164 may determine a change in the utilization of network resources based on a second communication procedure. In some implementations, the change in the utilization may be beneficial (i.e., use less resources) or harmful (i.e., use more resources). In this manner, different network resource utilizations may be determined for different communication procedures and non-network elements that implement the communication procedures.

For the purpose of illustration and expressly not limitation, a fast dormancy procedure is described below as an example of predicting effects of non-network elements using particular communication procedures.

Currently, mobile applications frequently send and receive data via mobile network 120 through various activities such as instant messages, web browsing, email, and other activities that cause data to be transmitted over mobile network 120. These and other frequent data transmissions utilize network resources, such as communication channels and request messages, as well as drain end user resources such as battery level of subscriber unit 130. In order to mitigate these effects, networks typically use inactivity timers for down switching subscriber unit 130 and moving it to a "CELL_FACH" state. The CELL_FACH state results in a reduction in signaling/messaging required for cell reselection as opposed to handover in a "CELL_DCH" and the lack of power control. As such, the CELL_FACH state typically uses less battery power. When in the CELL_FACH for a period exceeding another inactivity timer, mobile network 120 will cause subscriber unit 130 to transition to an "IDLE" state. via a "RRC_CONNECTION_RELEASE->ReleaseCause=userInactivity" message. In the IDLE state, resources utilized by subscriber unit 130 are released.

However, the foregoing inactivity timers are typically set to high values causing subscriber equipment 130 to remain in CELL_DCH and/or CELL_FACH states for unnecessarily long periods, draining its battery and tying up network resources so that they are unavailable to other users.

In an attempt to mitigate these effects, the 3rd Generation Partnership Project ("3GPP") has specified two "PCH states"—"URA_PCH" and "CELL_PCH." According to the 3GPP specification, the PCH states enable the UE to enter a low power consumption state, free up network resources and allow quick transition to CELL_FACH and CELL_DCH when user data transmission resumes.

However, few if any network operators have implemented the PCH states and therefore fail to take advantage of their benefits. As a result, many manufactures of user equipment, such as subscriber unit 130, and application developers have implemented proprietary methods of reducing battery consumption by means of the fast dormancy feature. Generally, this is accomplished by sending a "RRC_SIGNALING_CONNECTION_RELEASE_INDICATION" message, which was originally specified to be used in case of an unexpected error in the RRC procedure and causes subscriber unit 130 to switch to the IDLE state.

3GPP Release 8 introduced a new "Signaling Connection Release Indication Cause IE" having a bit value with the RRC_SIGNALLING_CONNECTION_RELEASE_INDICATION message. Particular subscriber units 130 that use this bit value will be able to inform mobile network 120 at the end of their PS data session of its use and will be switched to PCH state (if configured) instead of the IDLE state. As such, implementation of RRC_SIGNALLING_CONNECTION_RELEASE_INDICATION and/or the bit value may result in lower resource utilization while also reducing battery consumption in end user devices.

Some manufactures of user equipment 120 support the RRC_SIGNALLING_CONNECTION_RELEASE_INDICATION and/or the bit value while others do not. In many cases, however, even though various user equipment 120 are configured to use these messages/values, operators of mobile network 120 typically do not implement the procedure, thereby failing to take advantage of their benefits.

In some implementations of the invention, certain traffic data may indicate support of RRC_SIGNALLING_CONNECTION_RELEASE_INDICATION and/or the bit value by subscriber units 120. As such, computing device 160 may determine whether and which subscriber units 120 support these features, even if the wireless operators do not.

As previously noted, various implementations of the invention enable identification of particular communication procedures and their effects. In the fast dormancy feature example, network operators and other entities may identify various network elements and/or non-network elements such as subscriber units 130 that support the RRC_SIGNALLING_CONNECTION_RELEASE_INDICATION message and/or whether they support the new release indication IE bit value. Thus, based on a first communication procedure such as the procedure currently in use by most operators in which the RRC_SIGNALLING_CONNECTION_RELEASE_INDICATION and/or the bit value is not implemented, computing device 160 may determine a utilization of network resources such as the number of request messages transmitted as a result of various data transmissions. Based on a second communication procedure such as when RRC_SIGNALLING_CONNECTION_RELEASE_INDICATION and/or the bit value is used and implemented, computing device 160 may determine a change such as a reduction in the resource utilization as compared to the first communication procedure.

In some implementations, the determined reduction is a prediction based on network resource utilization if the second communication procedure is used. In other words, computing device 160 may determine the network resource utilization of the second procedure, such as a number of request messages if the RRC_SIGNALLING_CONNECTION_RELEASE_INDICATION and/or the bit value is used. Thus, in some implementations, computing device 160 may be used to estimate the potential reduction in signaling that network operators and others can achieve when PCH states are activated and subscriber units 130 utilizing the release bit are used.

In some implementations, the potential reduction or change in network resource utilization may be based on an assumption that all subscriber units 130 implement and use the second communication procedure. In other implementations, the potential reduction or change in network resource utilization may be based on an assumption that only a portion of all subscriber units 130 implement and use the second communication procedure (such as assuming that subscriber units 130 that support the RRC_SIGNALLING_CONNECTION_RELEASE_INDICATION and/or the bit value actually have these features implemented by mobile network 120). In a non-limiting example, a potential signaling reduction may be given by equation (1):

$$\Delta S = (N_{RRC}/N_{RRCRM}) * (N_{trans}/N_{trans2}) * 100 \tag{1},$$

where $\Delta S$ represents the Potential Signaling Reduction, $N_{RRC}$ represents a number of RRC_SIGNALLING_CONNECTION_RELEASE_INDICATION with NO SCRI bit used by a user equipment followed by a RRC_Connection_Request from the same IMSI within a defined short timer, $N_{RRCRM}$ represents a number of RRC_Connection_Request Messages, $N_{trans}$ represents a number of signaling messages to transition from URA/Cell_PCH to CELL_DCH/FACH, and $N_{trans2}$ represents a number of signaling message to transition from IDLE to CELL_DCH/FACH.

In some implementations of the invention, resource utilization module 164 may determine a change in the utilization of network resources by predicting the change based on a hypothetical use of the second communication procedure by the one or more non-network elements. In these implementations, the second communication procedure does not need to be actually implemented in order determine the change.

As previously noted, different non-network elements may implement the same communication procedure with different results. Thus, in some implementations, network resource utilization using a particular communication procedure may be predicted for different types of non-network elements that implement the particular communication procedure. For example, the reduction in network resource utilization may be greater for a first phone model than a second phone model. In another example, a particular vendor may produce phone models that may have a greater reduction in network resource utilization than a second vendor's phone models. According to various implementations of the invention, computing device 160 may be used to identify such differences.

In some implementations of the invention, resource utilization module 164 may determine a utilization of network resources by determining a number of connection request messages.

In some implementations of the invention, computing device 160 may determine an effect of the determined change in resource utilization on the subscriber experience. For example, by using a second communication procedure, a reduction in used resources may result in decreased dropped calls, increased data transmission rates, and/or other beneficial effects on the subscriber experience.

In some implementations of the invention, computing device 160 may determine a subscriber experience based on the determined change in utilization of network resources. For example, a decrease in signaling such as request messages may increase bandwidth and therefore improve subscriber experiences. Computing device 160 may determine the subscriber experience that results from the change in utilization of network resources.

In some implementations of the invention, computing device 160 may determine a subscriber experience associated with a performance of a mobile application on a mobile device based on the traffic data. In this manner, performance of the mobile application on the mobile device may be determined based on the change in network resource utilization depending on whether the second communication procedure is used.

In some implementations of the invention, computing device 160 may predict a performance of a mobile application hypothetically operating on a mobile device such as subscriber unit 130 based on the traffic data. In this manner, performance of the mobile application on the mobile device may be predicted based on the change in network resource utilization depending on whether the second communication procedure is used.

In some implementations of the invention, computing device 160 may determine a subscriber experience associated with a performance of a particular mobile device such as subscriber unit 130 on mobile network 120 based on the traffic data. In this manner, performance of the mobile device on mobile network 120 may be determined based on the change in network resource utilization depending on whether the second communication procedure is used.

In some implementations of the invention, computing device 160 may determine a subscriber experience associated with a performance of a particular mobile application on mobile network 120 based on the traffic data. In this manner, performance of the mobile application on the mobile device such as subscriber unit 120 may be determined based on the change in network resource utilization depending on whether the second communication procedure is used.

In some implementations of the invention, computing device 160 may generate a plurality of multi-dimensional user interfaces that display reports or other presentations that illustrate the effects of non-network elements on subscriber experience and/or resource utilization. The multi-dimensional user interfaces enable efficient drill-down viewing of different non-network elements and associated traffic data to facilitate troubleshooting and identification of particular non-network elements that may cause subscriber experience problems and/or resource utilization problems. Furthermore, computing device 160 may be used to optimize effects on subscriber experience and/or resource utilization by determining whether to use different communication methods than are currently in use based on traffic data associated with non-network elements.

In some implementations, computing device 160 may present the user interfaces and/or other results functions described herein via a webserver. In some implementations, computing device 160 may present the user interfaces and/or other results to a remote device via an application.

In some implementations, computing device 160 may group the traffic data according to network infrastructure elements such as cells or non-network elements such as phone model or operating system. In some implementations, computing device 160 allows drilling down from the groupings to underlying traffic data. For example, when grouped by cell, the user interfaces allow selection of each cell to show additional information based on the underlying radio channel measurements and traffic data associated with the selected cell.

When viewing details for a cell, for example, the additional information may include network utilization information such as number of connection request messages, type of communication procedure such as whether mobile devices communicating with the cell support the fast dormancy feature, potential change in resource utilization if particular communication procedures were implemented, and/or other underlying traffic data and radio channel measurements.

In some implementations, the detailed cell view may further be grouped by type of service utilized by the cell, type of messages communicated via the cell, and/or other data sub-groupings. In some implementations, a timeline for one or more cells may be displayed. The timeline may include resource utilizations such as requests to the one or more cells over time. In some implementations, the timeline may further display a number of requests associated with various communication procedures such as whether the fast dormancy feature is supported.

In some implementations, computing device 160 may similarly group and display non-network elements according to various multi-dimensional views. For example, information based on traffic data may be grouped by International Mobile Subscriber Identity (IMSI), particular phone models, operating systems, other non-network elements, time, cause of an exception such as a blocked call or a dropped call, geographic area and/or data groupings. Similar to groupings by cell, groupings by non-network elements may illustrate network utilizations, timelines, use of communication procedures, and/or other sub-groupings or additional information.

In some implementations, computing device 160 may display various subscriber experience metrics such as number of dropped calls and/or various performance indicators that may indicate a reason for the subscriber experience. For example, performance indicators for particular phone models may be correlated with dropped call events and displayed for analysis. Thus, the multi-dimensional user interfaces may be viewed from the perspective of different groupings while maintaining an ability to drill down in multiple dimensions, going all the way to investigating individual calls and their characteristics.

In some implementations of the invention, processor 166 may include one or more processors configured to perform the functions of computing device 160 described herein. In some implementations, memory 168 includes one or more tangible (i.e., non-transitory) computer readable media. In some implementations, memory 168 may include one or more instructions that when executed, configure processor 166 to perform the functions of computing device 160 described herein.

Although described as different modules, subscriber experience module 162 and resource utilization module 164 may be a single module so that the functions of the modules are performed by processor 166.

Figure 2:
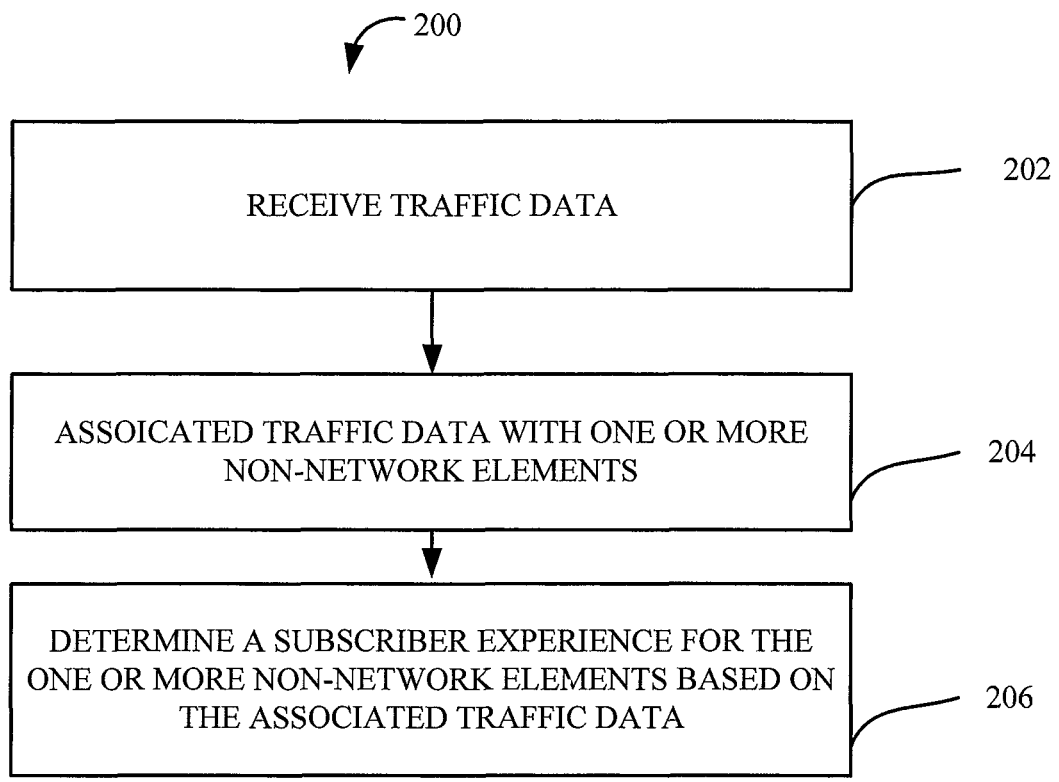
FIG. 2 is a flow diagram illustrating an example of a process of determining effects of non-network elements on a subscriber experience, according to various implementations of the invention.

FIG. 2 is a flow diagram illustrating an example of a process 200 of determining effects of non-network elements on a subscriber experience, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, in an operation 202 process 200 may receive traffic data. In some implementations of the invention, in an operation 204 process 200 may associate the traffic data with one or more non-network elements, wherein the one or more non-network elements operate on the mobile network but are not part of an infrastructure of the mobile network. In some implementations of the invention, in an operation 206 process 200 may determine a subscriber experience for the one or more non-network elements based on the traffic data that is associated with the one or more non-network elements.

Figure 3:
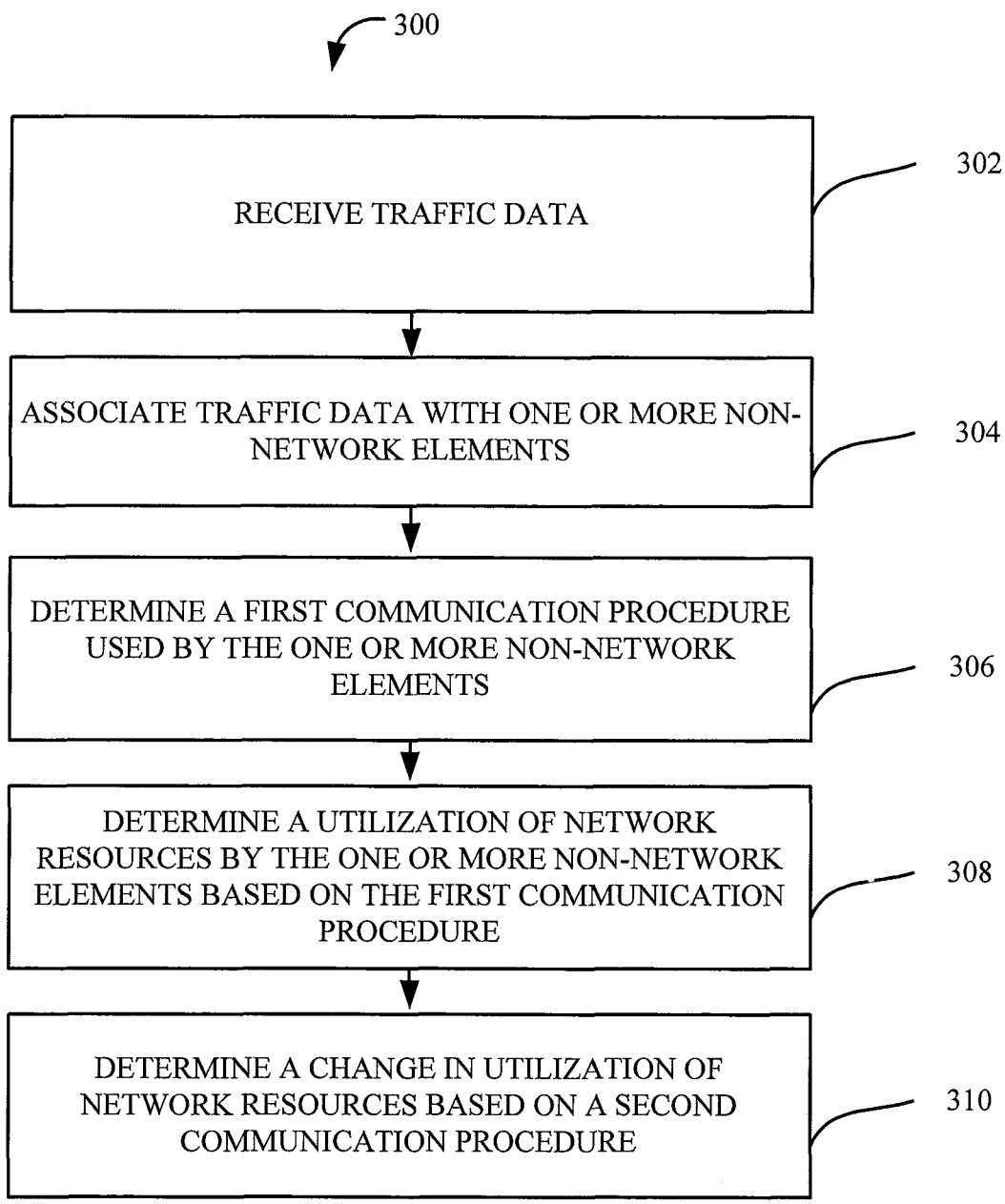
FIG. 3 is a flow diagram illustrating an example of a process of determining effects of non-network elements on utilization of network resources in a mobile network, according to various implementations of the invention.

FIG. 3 is a flow diagram illustrating an example of a process 300 of determining effects of non-network elements on utilization of network resources in a mobile network such as mobile network 120, according to various implementations of the invention. In some implementations of the invention, in an operation 302, process 300 may receive traffic data. In some implementations of the invention, in an operation 304, process 300 may associate the traffic data with one or more non-network elements. In some implementations, the one or more non-network elements operate on the mobile network but are not part of an infrastructure of the mobile network.

In some implementations of the invention, in an operation 306, process 300 may determine a first communication procedure used by the one or more non-network elements based on the associated traffic data. In some implementations of the invention, in an operation 308, process 300 may determine a utilization of network resources by the one or more non-network elements based on the first communication procedure. In some implementations of the invention, in an operation 310, process 300 may determine a change in the utilization of network resources based on a second communication procedure.

Figure 4:
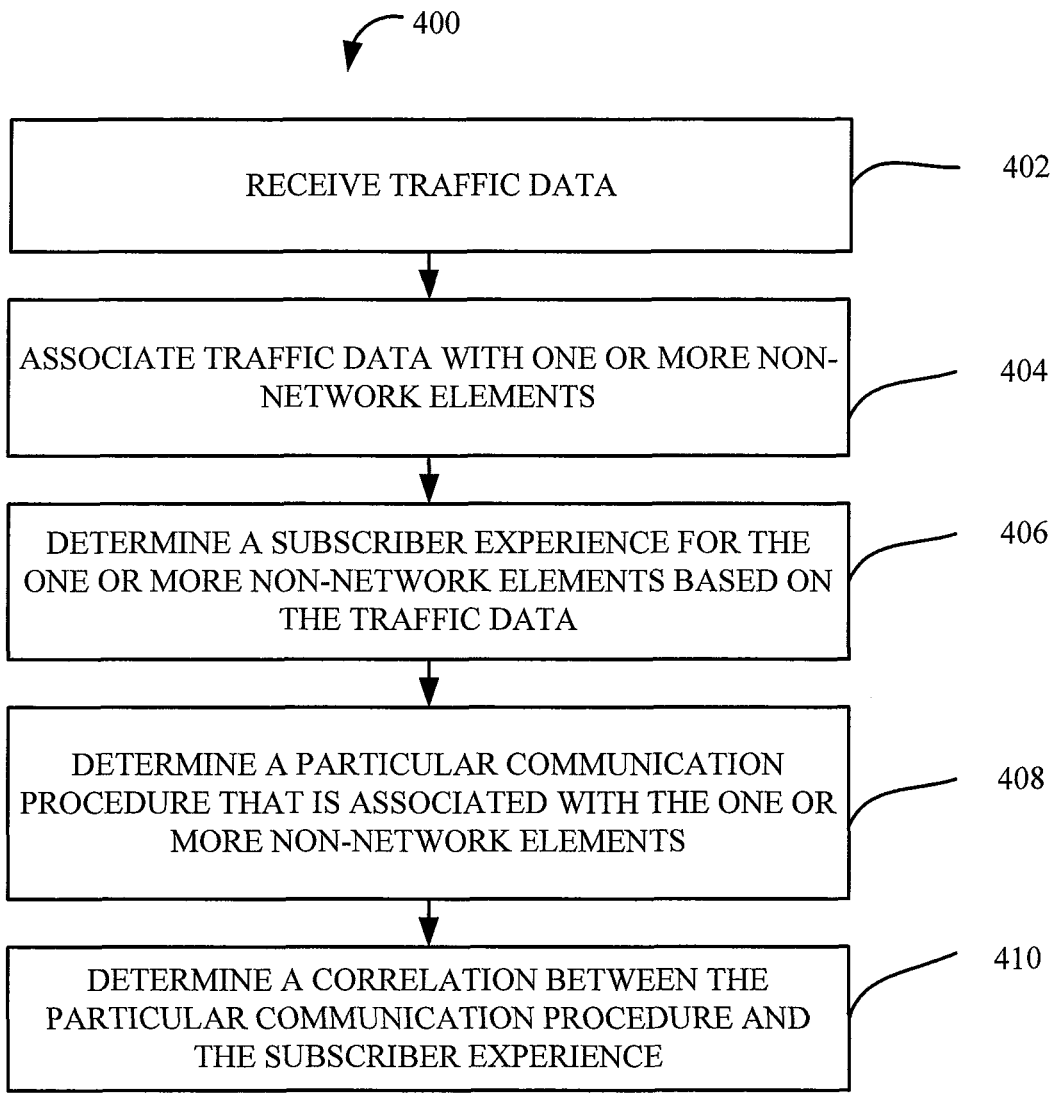
FIG. 4 is a flow diagram illustrating an example of a process of associating a subscriber experience with a particular communication procedure, according to various implementations of the invention.

FIG. 4 is a flow diagram illustrating an example of a process 400 of associating a subscriber experience with a particular communication procedure, according to various implementations of the invention.

In some implementations of the invention, in an operation 402, process 400 may receive traffic data. In some implementations, the traffic data may include one or more of: subscriber traffic data from an Operational Support System (OSS); test mobile traffic data from the OSS; subscriber traffic data from the OSS and test mobile traffic data from the OSS; subscriber traffic data from the OSS, test mobile traffic data from the OSS and test mobile traffic data from a test mobile; or test mobile traffic data from the OSS and test mobile traffic data from the test mobile.

In some implementations of the invention, in an operation 404, process 400 may associate the traffic data with one or more non-network elements. In some implementations, the one or more non-network elements operate on the mobile network but are not part of an infrastructure of the mobile network.

In some implementations of the invention, in an operation 406, process 400 may determine a subscriber experience for the associated one or more non-network elements based on the traffic data. In some implementations of the invention, in an operation 408, process 400 may determine a particular communication procedure that is associated with the one more non-network elements. In some implementations of the invention, in an operation 410, process 400 may determine a correlation between the particular communication procedure and the subscriber experience.

By example and not limitation, process 400 may be used to determine dropped calls for different phone models based on traffic data and determine a communication procedure associated with each of the different phone models, such as whether a given phone model supports the fast dormancy feature described herein. Process 400 may determine a correlation between the particular communication procedure and the subscriber experience. For example, the correlation may include determining particular reasons for the dropped call such as, among others, channel switching failure, congestion, hard handover problems, IFHO, radio connection supervision, time, geographic area, exception reason, and soft handover failures. Based on the particular reasons, process 400 may be used to determine whether implementing the communication procedure would improve (decreased) the number of dropped calls and/or the extent of improvement based on which phone models support the communication procedure.

In some implementations, process 400 may be used to group data by other information, such as by network infrastructure elements such as cells or by non-network elements. For example, dropped calls may be grouped and counted by cell. The number of phones communicating with each cell that supports the communication procedure may be grouped by the cell. In this manner, different views of the traffic data based on non-network elements, subscriber experience, resource utilization, and/or communication procedures may be achieved.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer implemented method for determining effects of non-network elements on a subscriber experience in a mobile network, comprising:
    receiving, by one or more processors of a computing device, traffic data;
    associating, by the computing device, the traffic data with one or more non-network elements, wherein the one or more non-network elements operate on the mobile network but are not part of an infrastructure of the mobile network; and
    determining, by the computing device, a subscriber experience for the one or more non-network elements based on the traffic data that is associated with the one or more non-network elements; wherein:
    the one or more non-network elements is identified by one or more of: a make of a mobile device, a model of a mobile device, an operating system of a mobile device, a mobile application operating via the mobile network, or a version of a mobile application.

2. The computer implemented method of claim 1, wherein receiving traffic data further comprises receiving, subscriber traffic data from an Operational Support System (OSS) and test traffic data from the OSS.

3. The computer implemented method of claim 2, further comprising: receiving, test traffic data from a test mobile device.

4. The computer implemented method of claim 1, wherein receiving traffic data further comprises receiving subscriber traffic data from an Operational Support System.

5. The computer implemented method of claim 1, wherein receiving traffic data further comprises receiving test traffic data from an Operational Support System.

6. The computer implemented method of claim 5, further comprising: receiving test traffic data from a test mobile device.

7. The computer implemented method of claim 1, wherein the subscriber experience comprises one or more of: a number of dropped calls, an accessibility, a retainability, a voice quality, a mobility, a data integrity, or a data transfer rate.

8. The computer implemented method of claim 1, wherein determining a subscriber experience further comprises determining a negative subscriber experience.

9. The computer implemented method of claim 8, further comprising:
    determining at least two non-network elements that are correlated with the negative subscriber experience.

10. The computer implemented method of claim 8, further comprising:
    associating one or more network parameters with the negative subscriber experience, wherein the one or more network parameters are used to at least in part determine a cause of the negative subscriber experience.

11. The computer implemented method of claim 1, wherein determining a subscriber experience further comprises determining a subscriber experience associated with a performance of a mobile application on a mobile device based on the traffic data.

12. The computer implemented method of claim 11, wherein determining a subscriber experience further comprises predicting a performance of a mobile application hypothetically operating on a mobile device based on the traffic data.

13. The computer implemented method of claim 1, wherein determining a subscriber experience further comprises determining a subscriber experience associated with a performance of a particular mobile device on the mobile network based on the traffic data.

14. The computer implemented method of claim 1, wherein determining a subscriber experience further comprises determining a subscriber experience associated with a performance of a particular mobile application on the mobile network based on the traffic data.

15. A computing device for determining effects of non-network elements on a subscriber experience in a mobile network, comprising:
    one or more processors configured to:
        receive traffic data;
        associate the traffic data with one or more non-network elements, wherein the one or more non-network elements operate on the mobile network but are not part of an infrastructure of the mobile network; and
        determine a subscriber experience for the one or more non-network elements based on the traffic data that is associated with the one or more non-network elements;
    wherein:
    the one or more non-network elements is identified by one or more of: a make of a mobile device, a model of a mobile device, an operating system of a mobile device, a mobile application operating via the mobile network, or a version of a mobile application.

16. The computing device of claim 15, wherein receive traffic data further comprises receive traffic data from an Operational Support System (OSS) and test traffic data from the OSS.

17. The computing device of claim 16, the one or more processor further configured to receive test traffic data from a test mobile device.

18. The computing device of claim 15, wherein receive traffic data further comprises receive subscriber traffic data from an Operational Support System.

19. The computing device of claim 15, wherein receive traffic data further comprises receive test traffic data from an Operational Support System.

20. The computing device of claim 19, the one or more processors further configured to receive test traffic data from a test mobile device.

21. The computing device of claim 15, wherein the subscriber experience comprises one or more of: a number of dropped calls, an accessibility, a retainability, a mobility, a voice quality, a data integrity, or a data transfer rate.

22. The computing device of claim 15, wherein determine a subscriber experience further comprises determine a negative subscriber experience.

23. The computing device of claim 22, the one or more processors further configured to:
   determine at least two non-network elements that are correlated with the negative subscriber experience.

24. The computing device of claim 22, the one or more processors further configured to:
   associate one or more network parameters with the negative subscriber experience, wherein the one or more network parameters are used to at least in part determine a cause of the negative subscriber experience.

25. The computing device of claim 15, wherein determine a subscriber experience further comprises determine a subscriber experience associated with a performance of a mobile application on a mobile device based on the traffic data.

26. The computing device of claim 25, wherein determine a subscriber experience further comprises predict a performance of a mobile application hypothetically operating on a mobile device based on the traffic data.

27. The computing device of claim 15, wherein determine a subscriber experience further comprises determine a subscriber experience associated with a performance of a particular mobile device on the mobile network based on the traffic data.

28. The computing device of claim 15, wherein determine a subscriber experience further comprises determine a subscriber experience associated with a performance of a particular mobile application on the mobile network based on the traffic data.

29. A computer implemented method for determining effects of non-network elements on a subscriber experience in a mobile network, wherein the non-network elements are not part of an infrastructure of the mobile network, the method comprising:
   receiving, by one or more processors of a computing device, traffic data, the traffic data comprising one or more of:
      subscriber traffic data from an Operational Support System (OSS);
      test mobile traffic data from the OSS;
      subscriber traffic data from the OSS and test mobile traffic data from the OSS;
      subscriber traffic data from the OSS, test mobile traffic data from the OSS and test mobile traffic data from a test mobile; or
      test mobile traffic data from the OSS and test mobile traffic data from the test mobile;
   associating, by the computing device, the traffic data with one or more of said non-network elements; and
   determining, by the computing device, a subscriber experience of network resources based on the traffic data;
   wherein:
   the non-network elements are one or more from the group consisting of: a make of a mobile device, a model of a mobile device, an operating system of a mobile device, a mobile application operating via the mobile network, or a version of a mobile application.

30. The computer implemented method of claim 29, further comprising:
   determining, by the computing device, a particular communication procedure associated with the one or more non-network elements; and
   determining, by the computing device, a correlation between the particular communication procedure and the subscriber experience.

* * * * *